(12) United States Patent
Brehmer et al.

(10) Patent No.: US 9,797,481 B2
(45) Date of Patent: Oct. 24, 2017

(54) POSITIVE-LOCKING SHIFTING DEVICE OF A TRANSMISSION

(71) Applicant: ZF Friedrichshafen AG, Friedrichshafen (DE)

(72) Inventors: Martin Brehmer, Tettnang (DE); Peter Ziemer, Tettnang (DE); Kim Führer, Lindau (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/149,674

(22) Filed: May 9, 2016

(65) Prior Publication Data
US 2016/0341287 A1 Nov. 24, 2016

(30) Foreign Application Priority Data
May 19, 2015 (DE) .................. 10 2015 209 142

(51) Int. Cl.
*F16H 3/083* (2006.01)
*F16H 3/66* (2006.01)
(Continued)

(52) U.S. Cl.
CPC .......... *F16H 3/663* (2013.01); *F16H 3/083* (2013.01); *F16H 2003/0811* (2013.01);
(Continued)

(58) Field of Classification Search
None
See application file for complete search history.

(56) References Cited

U.S. PATENT DOCUMENTS 6,305,518 B1 * 10/2001 Buri .................. F16D 23/06
192/114 T
6,811,010 B1 * 11/2004 Armstrong .............. F16D 23/06
192/48.91
(Continued)

FOREIGN PATENT DOCUMENTS

DE 10121634 A1 11/2002
DE 102006001646 A1 7/2006
DE 102013226471 A1 6/2015

OTHER PUBLICATIONS

German Search Report DE102015209142.2, dated Jan. 22, 2016. (7 pages).

*Primary Examiner* — Justin Holmes
(74) *Attorney, Agent, or Firm* — Dority & Manning, P.A.

(57) ABSTRACT

A positive-locking shifting device of a transmission connects one element of a first planetary gear set to one element of a second planetary gear set in a first shifting position and connects an additional element of the second planetary gear set to a torque-proof element of the transmission in a second shifting position. A single element of the shifting device is axially displacable between the first and second shifting positions. A shiftable operative connection between the torque-proof element of the transmission and the additional element of the second planetary gear set disposed, at least in sections, axially between the first and second planetary gear sets. The shiftable operative connection between the torque-proof element of the transmission and the additional element of the second planetary gear set intersecting a shiftable operative connection between the one element of the first planetary gear set and the one element of the second planetary gear set.

6 Claims, 8 Drawing Sheets

(51) Int. Cl.
*F16H 3/08* (2006.01)
*F16H 3/44* (2006.01)

(52) U.S. Cl.
CPC .................. *F16H 2003/445* (2013.01); *F16H 2200/0052* (2013.01); *F16H 2200/0086* (2013.01); *F16H 2200/2007* (2013.01); *F16H 2200/2023* (2013.01); *F16H 2200/2048* (2013.01); *F16H 2200/2051* (2013.01); *F16H 2200/2064* (2013.01); *F16H 2200/2094* (2013.01)

(56) References Cited

U.S. PATENT DOCUMENTS

| | | | |
|---|---|---|---|
| 7,291,087 B2 | 11/2007 | Haka et al. | |
| 2006/0094560 A1* | 5/2006 | Haka | F16H 3/663 475/280 |
| 2008/0132374 A1* | 6/2008 | Puiu | B60W 20/30 475/269 |
| 2010/0190602 A1* | 7/2010 | Wittkopp | F16H 3/66 475/303 |

* cited by examiner

|    | 03 | 06 | 08 | 13 | 14 | 18 | 28 |
|----|----|----|----|----|----|----|----|
| G1 |    | X  |    | X  |    |    | X  |
| G2 |    | X  |    |    | X  |    | X  |
| G3 |    | X  |    | X  | X  |    | X  |
| G4 | X  |    |    |    |    | X  | X  |
| G5 | X  |    |    |    | X  | X  | X  |
| G6 |    |    |    |    |    | X  | X  |
| R1 |    | X  | X  | X  |    |    |    |
| R2 |    | X  | X  |    | X  |    |    |

Fig. 3

|    | 03 | 06 | 08 | 13 | 14 | 18 | 28 | 09 |
|----|----|----|----|----|----|----|----|----|
| G1 |    | X  |    | X  |    |    | X  |    |
| G2 |    | X  |    |    | X  |    | X  |    |
| G3 |    | X  |    |    |    |    | X  |    |
| G4 |    |    |    | X  | X  | X  | X  |    |
| G5 | X  |    |    |    |    | X  | X  |    |
| G6 | X  |    |    |    | X  | X  |    |    |
| R1 |    |    | X  | X  |    |    |    | X  |
| R2 |    |    | X  |    |    |    |    | X  |

Fig. 7

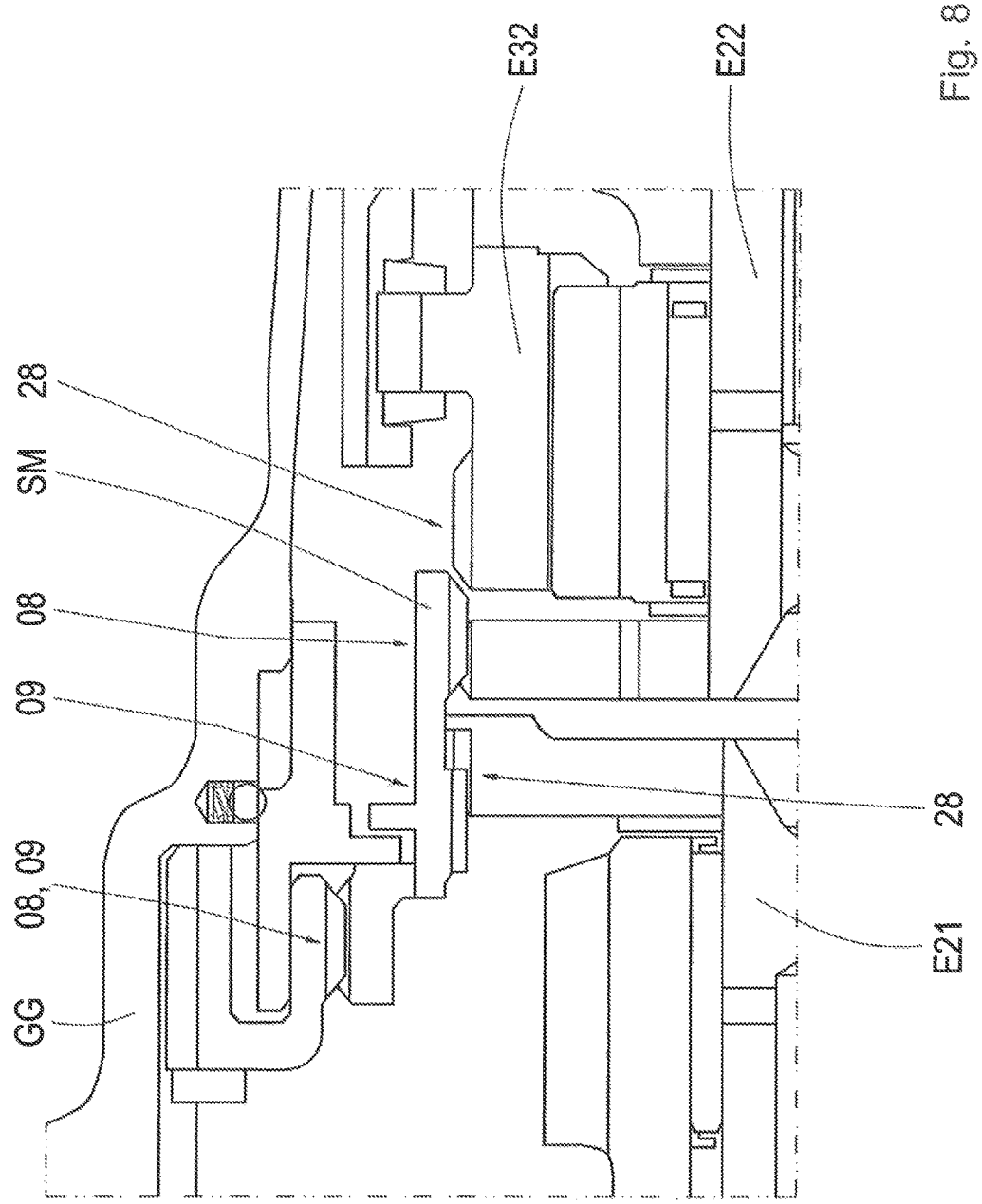

POSITIVE-LOCKING SHIFTING DEVICE OF A TRANSMISSION

FIELD OF THE INVENTION

The present invention relates generally to a positive-locking shifting device of a transmission, which features at least two planetary gear sets.

BACKGROUND

Herein, a transmission in particular designates a multi-speed transmission, with which a multitude of gears, thus transmission ratio relationships between a drive shaft and the output shaft, are shiftable by shifting elements, preferably automatically. Here, the shifting elements comprise, for example, clutches or brakes. Such transmissions are primarily used in automotive applications, in order to adjust the rotational speed and torque output characteristics of the drive unit to the driving resistance of the vehicle in a suitable manner.

Patent application DE 101 21 634 A1 of the applicant discloses a manual transmission in group design with a coaxially arranged drive shaft and output shaft, which features a layshaft and multiple pairs of gear wheels distributed on the shafts, which are shiftable by clutches. Between an idler gear mounted on the end of the drive shaft and an idler gear mounted on the beginning of the output shaft, a shifting device is provided across the area on which the shafts are connected to each other. The shifting device firmly connects, in a first shifting position, the idler gear to the output shaft and, in a second shifting position, the idler gear to the drive shaft.

SUMMARY OF THE INVENTION

The task of the present invention is to further develop the method known from prior art for an application in a transmission based on a planetary gear set.

In accordance with exemplary aspects of the invention, a shifting device of a transmission with at least two planetary gear sets is proposed, whereas the shifting device may occupy at least a first shifting position and a second shifting position. Each of the planetary gear sets features three elements: sun gear, carrier and ring gear. In the first shifting position, the shifting device connects one of the elements of the first planetary gear set to one of the elements of the second planetary gear set. In the second shifting position, the shifting device connects an additional one of the elements of the second planetary gear set to a constantly torque-proof element of the transmission, which may be (for example) a housing of the transmission. The connections produced by the shifting device are produced through a positive connection. A change between the first and second shifting positions is achieved by the axial displacement of a single element of the shifting device. Thereby, the shiftable operative connection produced in such a manner between the torque-proof element and the additional element of the second planetary gear is arranged, at least in sections, axially between the first and second planetary gear sets, and intersects with the shiftable operative connection between the element of the first planetary gear set and the element of the second planetary gear set.

The shifting device formed in such a manner opens up new possibilities for producing the connection between the participating transmission elements. The following initial situation is provided as an example: the carrier of the first planetary gear set is to be connected to the ring gear of the second planetary gear set, and the carrier of the second planetary gear set is to be fixed in a shiftable, torque-proof manner to the housing. If the carrier of the second planetary gear is fixed in a torque-proof manner, there is no connection between the carrier of the first planetary gear set and the second planetary gear set. Due to additional constraints, it is not possible to guide the connection between the carrier of the first planetary gear set and the ring gear of the second planetary gear set radially inside of the second planetary gear set. As a conventional outlet, the second planetary gear set is designed with a split ring gear, whereas the connection of the carrier of the second planetary gear set is arranged on the housing between the two parts of the ring gear. However, this impairs the degree of efficiency of the transmission, since two additional toothings enter into the power flow, namely the first ring gear at the planetary gears and the planetary gears at the second ring gear. In addition, the required axial installation space of the transmission increases. Through the solution in accordance with exemplary aspects of the invention, a splitting of the ring gear of the second planetary gear set is not necessary, since the proposed shifting device enables an intersection of the operative connections. Of course, the shifting device can be applied to other initial situations as well, and is not limited to the situation described above. For example, instead of the carrier of the first planetary gear set, the sun gear or the ring gear could be connected to the ring gear of the second planetary gear set.

Preferably, the shifting device is configured in order to, in addition to the element of the second planetary gear set, also fix the element of the first planetary gear set in a torque-proof manner in its second shifting position. Thereby, the functionality of the shifting device is further increased.

According to one exemplary embodiment, the shifting device is configured in a central position in order to occupy a neutral position. In the neutral position, the element of the first planetary gear set is not connected to the element of the second planetary gear set, and the additional element of the second planetary gear set is not connected to the torque-proof element. This facilitates a switching process between the first and second shifting positions, for example, for the purpose of synchronization.

Preferably, in all forward gears of the transmission, the shifting device is in the first shifting position, and, in at least one reverse gear of the transmission, in the second shifting position. This is because, with transmissions based on planetary gear sets, it is typical that one element of the planetary gear sets is to be fixed in a torque-proof manner, in order to produce a mechanical reverse gear between the drive shaft and the output shaft. However, if the torque-proof fixing of this element is solely required for forming the reverse gear, the shifting device is particularly suitable for the expansion of transmissions that have previously not featured a mechanical reverse gear due to reasons of manufacturing feasibility.

A planetary gear set includes one sun gear, one carrier and one ring gear. Planetary gears that mesh with the toothing of the ring gear and/or with the toothing of the sun gear are rotatably mounted on the bar. A negative planetary gear set describes a planetary gear set with a carrier on which the planetary gears are rotatably mounted, with one sun gear and one ring gear, whereas the toothing of at least one of the planetary gears meshes with both the toothing of the sun gear and with the toothing of the ring gear, by which the ring gear and the sun gear rotate in opposite directions, if the sun gear rotates with a fixed bar. A positive gear set differs from the negative planetary gear set just described in that the positive gear set features inner and outer planetary gears, which are rotatably mounted on the bar. Thereby, the toothing of the inner planetary gears meshes, on the one hand, with the toothing of the sun gear and, on the other hand, with the toothing of the outer planetary gears. The toothing of the outer planetary gears also meshes with the toothing of the ring gear. This has the consequence that, with a fixed planetary bar, the ring gear and the sun gear rotate in the same direction of rotation.

BRIEF DESCRIPTION OF THE DRAWINGS

Exemplary embodiments of the invention are described in detail on the basis of the attached figures.

FIG. 3 shows a shifting diagram of the transmission of FIG. 2.

FIG. 7 shows a shifting diagram of the transmission according to the second exemplary embodiment shown in FIG. 6.

FIG. 8 shows the shifting device of the second exemplary embodiment in the second shifting position.

DETAILED DESCRIPTION

Figure 1:
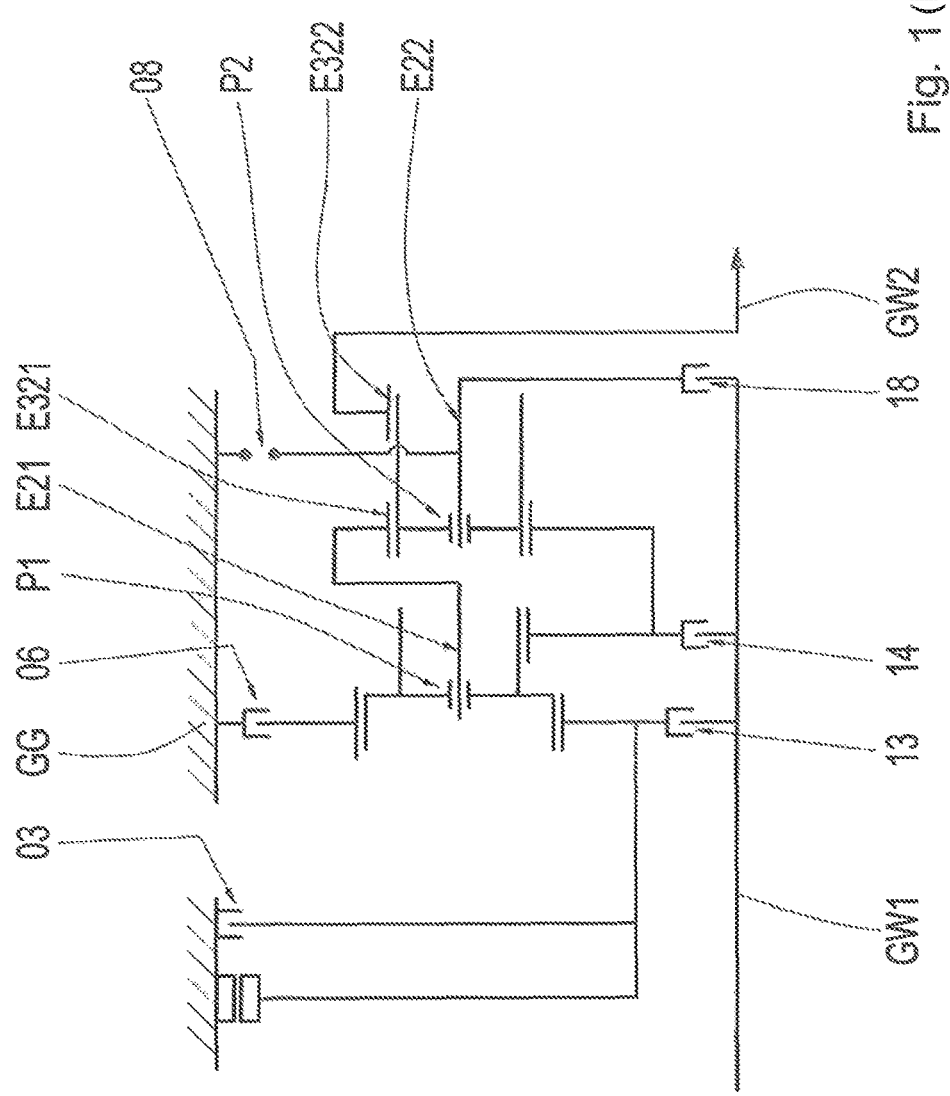
FIG. 1 schematically shows a transmission according to a conventional design.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a transmission according to a conventional design. The transmission features a first planetary gear set P1 and a second planetary gear set P2, which are both formed as negative planetary gear sets. The first planetary gear set P1 is formed as a staged planetary gear set. The second planetary gear set P2 features separate ring gears E321, E322. A sun gear of the first planetary gear set P1 is in mesh with the larger-diameter planetary gears, and is permanently connected to a rotor of an electric motor. An additional sun gear of the first planetary gear set P1 is constantly connected to a sun gear of the second planetary gear set P2. A carrier E21 of the first planetary gear set P1 is constantly connected to the ring gear E321 of the second planetary gear set P2. The ring gear E322 of the second planetary gear set P2 is constantly connected to an output shaft GW2 of the transmission.

A drive shaft GW1 is connected through a shifting element 13 to the sun gear of the first planetary gear set P1, which is in mesh with the larger diameter of the planetary gears. The drive shaft GW1 is connectable through a shifting element 14 to the sun gear of the first planetary gear set P1, which is in mesh with the smaller diameter of the planetary gears. The drive shaft GW1 is connectable through a shifting element 18 to a carrier E22 of the second planetary gear set P2. The sun gear of the first planetary gear set P1, which is in mesh with the larger diameter of the planetary gears, can be fixed in a torque-proof manner through a shifting element 03. A ring gear of the first planetary gear set P1, which is in mesh with the larger diameter of the planetary gears, can be fixed in a torque-proof manner through a shifting element 06. The carrier E22 of the second planetary gear set P2 can be fixed in a torque-proof manner through a shifting element 08. Thereby, the connection of the carrier E22 of the second planetary gear set P2 to the shifting element 08 runs between the two ring gears E321, E322. Through the selective closing in pairs of the shifting elements, six forward gears and two reverse gears can be represented.

Figure 2:
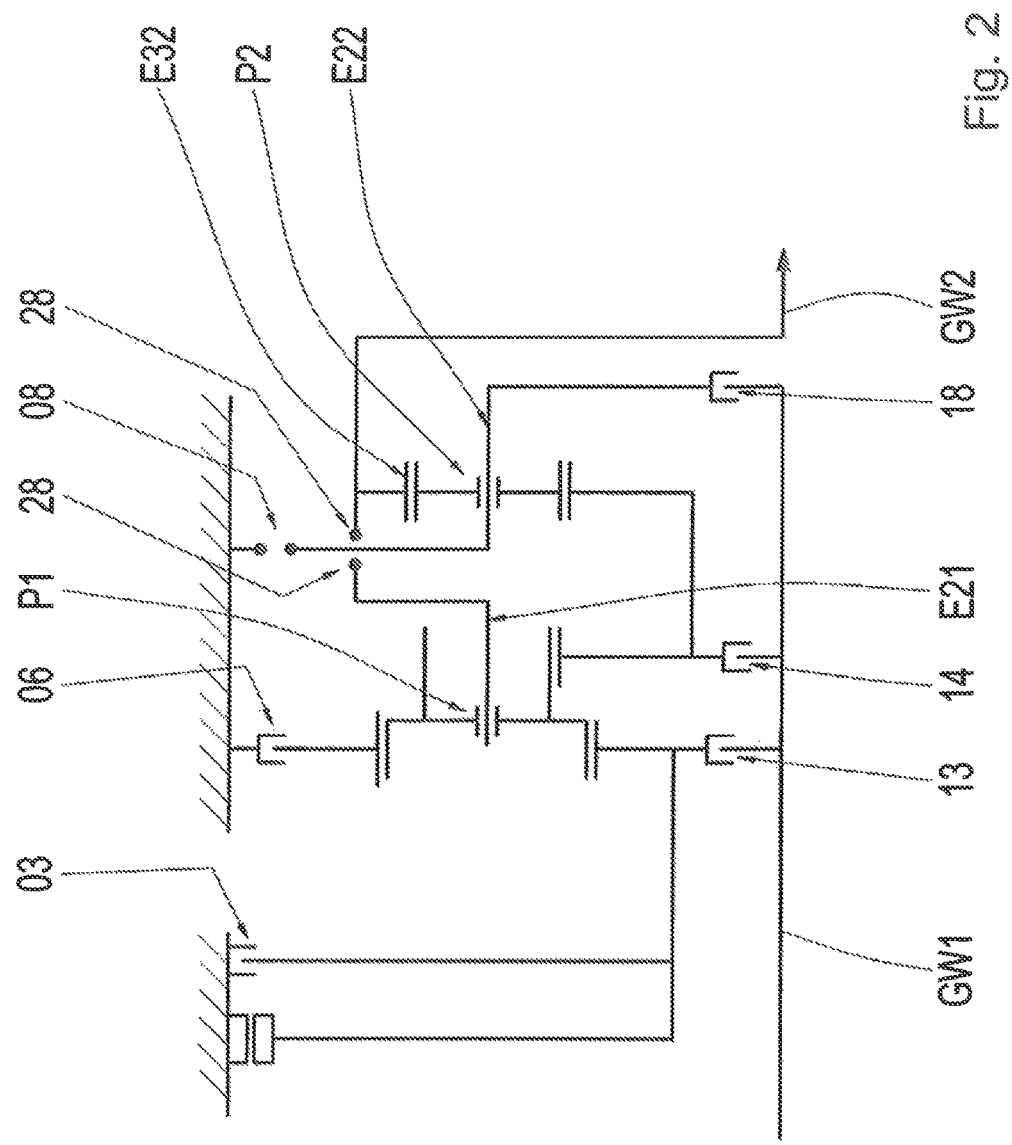
FIG. 2 schematically shows a transmission with an exemplary shifting device in accordance with aspects of the invention.

FIG. 2 schematically shows a transmission with a shifting device in accordance with exemplary aspects of the invention. In contrast to the transmission shown in FIG. 1, the second planetary gear set P2 of the transmission in accordance with the exemplary embodiment shown of FIG. 2 features only a single ring gear E32. In addition, the transmission features an additional shifting element 28, which enables a shiftable connection between the carrier E21 of the first planetary gear set P1 and the ring gear E32 of the second planetary gear set P2. Thereby, the operative connection between the carrier E22 of the second planetary gear set P2 and the shifting element 08 runs, at least in sections, axially between the first planetary gear set P1 and the second planetary gear set P2. The shiftable operative connection between the carrier E21 of the first planetary gear set P1 and the ring gear E32 of the second planetary gear set P2 intersects with the shiftable operative connection between the carrier E22 of the second planetary gear set P2 and a housing GG of the transmission. Since the second planetary gear set P2 features only a single ring gear E32, the need for axial installation space of the transmission is significantly reduced, and the degree of efficiency of the transmission is improved.

FIG. 3 shows a shifting diagram for the exemplary transmission that is shown in FIG. 2. In the rows of the shifting diagram, six forward gears G1 to G6 and two reverse gears R1, R2 are shown. With an X, the columns of the shifting diagram present which of the shifting elements 03, 06, 08, 13, 14, 18, 28, in which forward gear G1 through G6 or reverse gear R1, R2, are closed. The shifting element 28 is closed in all forward gears G1 to G6, while the shifting element 08 is open in all of such forward gears G1 to G6. By contrast, in the reverse gears R1, R2, the shifting element 08 is closed, while the shifting element 28 is open in the reverse gears R1, R2.

Figure 4:
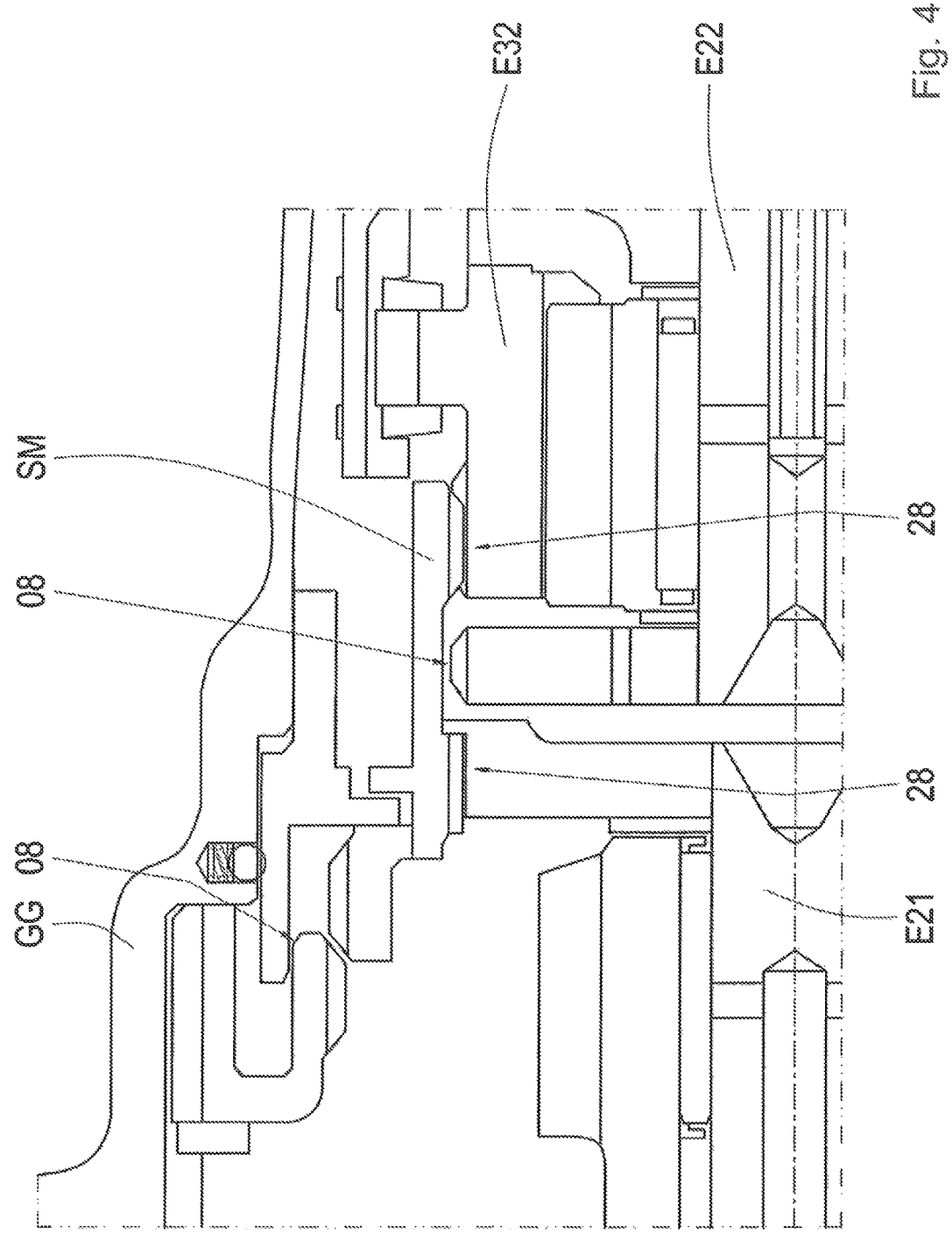
FIG. 4 shows the exemplary shifting device of FIG. 2 in a first shifting position.

FIG. 4 shows a cut-out of a sectional view of the through transmission shown in FIG. 2. A shaft connected to the carrier E21 of the first planetary gear set P1 features, on its outer diameter, a claw toothing. In the same manner, a shaft connected to the carrier E22 of the second planetary gear set P2 features, on its outside diameter, a claw toothing. The ring gear E32 of the second planetary gear set P2 also features, on its outer diameter, a claw toothing. A sliding sleeve SM features, on its inner diameter, two claw toothings that are separated from each other. Depending on the axial position of the sliding sleeve SM, the claw toothings of the sliding sleeve SM engage in the claw toothings that are connected to the claw toothings formed on the elements of the planetary gear sets P1, P2. The sliding sleeve SM features an additional claw toothing, which, depending on the axial position of the sliding sleeve SM, is configured in order to arrive in engagement with a claw toothing fixed in a torque-proof manner. By means of a driver, the axial position of the sliding sleeve SM is variable. This can take place in a hydraulic or electromechanical manner, depending on the embodiment. In the axial position of the sliding sleeve SM shown in FIG. 4, the shifting element 28 is closed. Thus, the shifting element 28 connects the carrier E21 of the first planetary gear set P1 to the ring gear E32 of the second planetary gear set P2 in a positive-locking manner. In such axial position of the sliding sleeve SM, the claw toothing that is formed at the shaft connected to the carrier E22 of the second planetary gear set P2 is not engaged in a claw toothing of the sliding sleeve SM. In such axial position of the sliding sleeve SM, the claw toothing of the element fixed in a torque-proof manner is likewise not engaged in a claw toothing of the sliding sleeve SM. Thus, the shifting element 08 is open.

Figure 5:
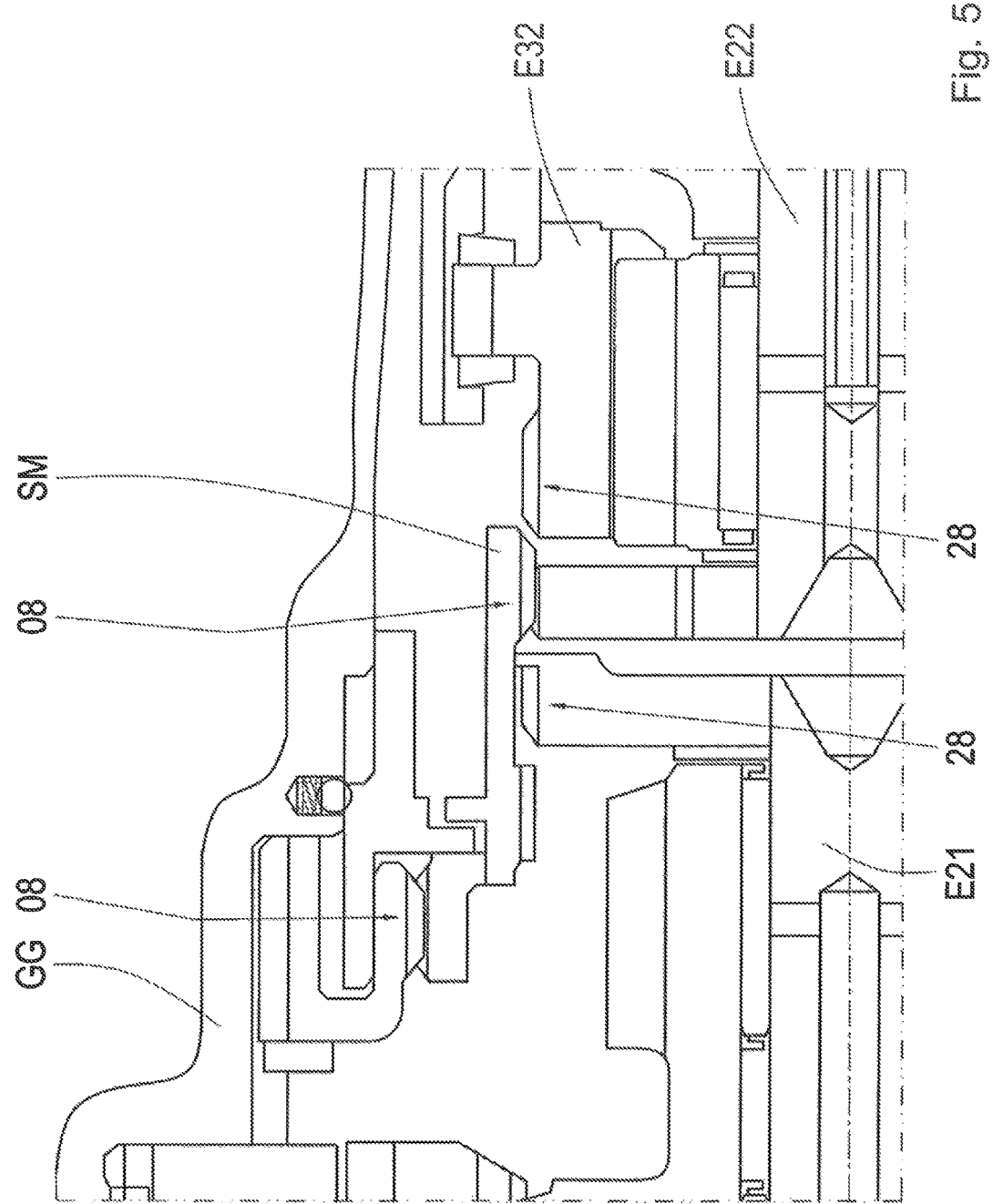
FIG. 5 shows the exemplary shifting device of FIG. 2 in a second shifting position.

FIG. 5 shows a cut-out of the transmission in FIG. 2 with the shifting device in accordance with the invention in a second shifting position. In the second shifting position, the shifting element 08 is closed and the shifting element 28 is open. For this purpose, the sliding sleeve SM is in an axial position, in which the claw toothing formed on the sliding sleeve SM is engaged with the claw toothing that is fixed in a torque-proof manner. That claw toothing of the sliding sleeve SM that was engaged in the first shifting position with the claw toothing formed on the ring gear E32 of the second planetary gear set P2 is now in engagement with that claw toothing that is formed on the shaft connected to the carrier E22 of the second planetary gear set P2.

Figure 6:
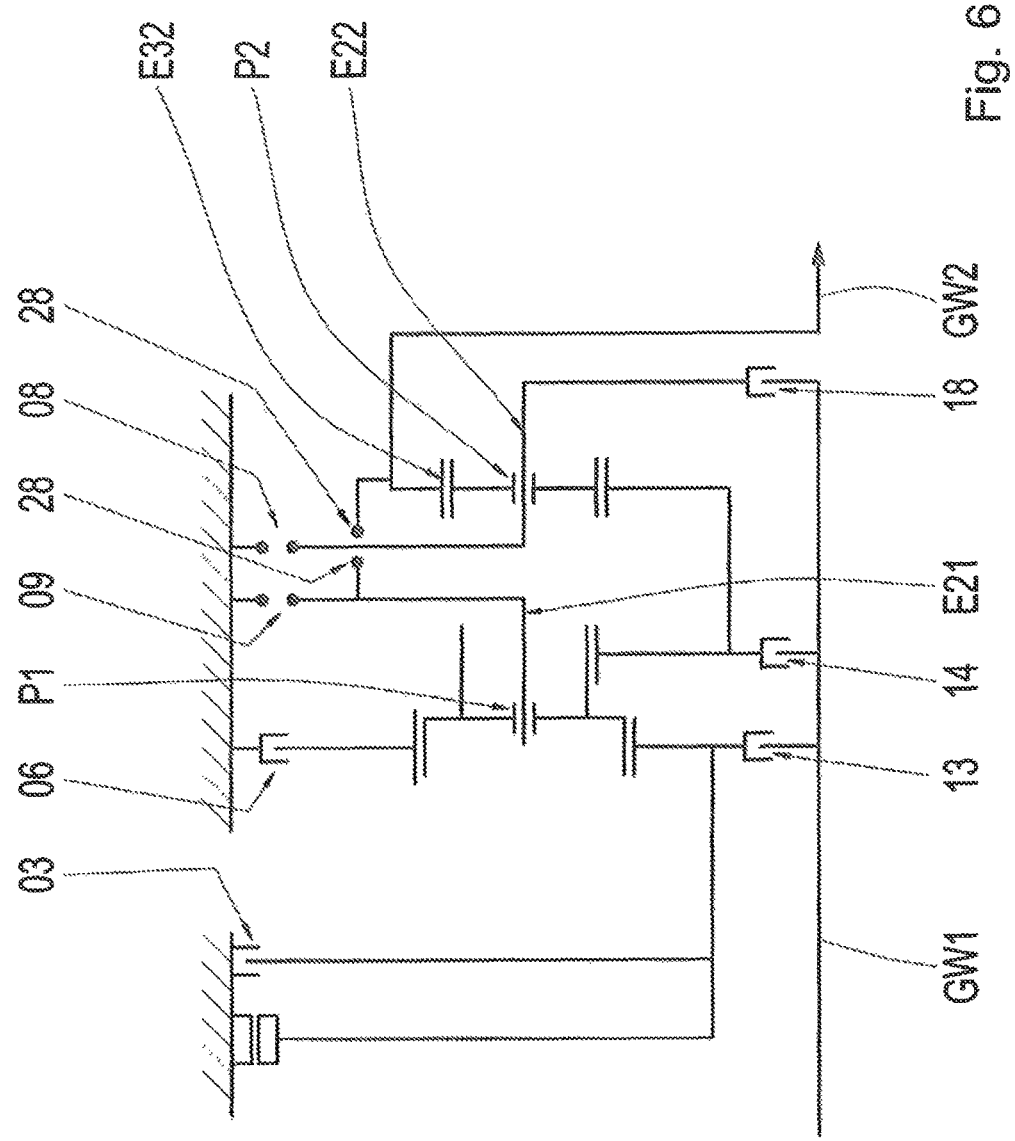
FIG. 6 schematically shows a transmission according to a second exemplary embodiment.

FIG. 6 schematically shows a transmission according to a second exemplary embodiment. In contrast to the exemplary transmission shown in FIG. 2, the exemplary transmission shown in FIG. 6 features an additional shifting element 09. The additional shifting element 09 is configured in order to fix the carrier E21 of the first planetary gear set P1 in a torque-proof manner. This enables an alternative form of the reverse gears R1, R2.

FIG. 7 shows a shifting diagram of the exemplary transmission shown in FIG. 6. Thereby, the additional shifting element 09 is closed only in the reverse gears R1, R2. In the forward gears G1 to G6, the additional shifting element 09 is open.

FIG. 8 shows a cut-out of a sectional view of the exemplary transmission shown in FIG. 6. Thereby, the shifting device in accordance with exemplary aspects of the invention is in the second shifting position, in which the shifting element 08 and the additional shifting element 09 are closed. Through the axial displacement of the sliding sleeve SM in a right direction from the position shown in FIG. 8, the first shifting position, in which the shifting element 08 and the additional shifting element 09 are open and the shifting element is 28 is closed, can be produced.

FIGS. 2 through 8 only show embodiments in which the application of the shifting device in accordance with aspects of the invention is possible. However, the application of the shifting device in accordance with the invention is not limited to such exemplary embodiments. The shifting device in accordance with aspects of the invention may be configured in order to connect any element of the first planetary gear set P1, thus the sun gear, carrier or ring gear, to any element of the second planetary gear set P2 in a first shifting position of the shifting device. In the second shifting position of the shifting device, an additional element of the second planetary gear set P2 may be connected to an element of the transmission that is constantly torque-proof.

Modifications and variations can be made to the embodiments illustrated or described herein without departing from the scope and spirit of the invention as set forth in the appended claims.

REFERENCE SIGNS

GG Torque-proof element, for example a housing
GW1 Drive shaft
GW2 Output shaft
P1 First planetary gear set
E21 Element of the first planetary gear set, for example a carrier
P2 Second planetary gear set
E22 Additional element of the second planetary gear set, for example a carrier
E32 Element of the second planetary gear set, for example a ring gear
E321 Ring gear of the second planetary gear set
E322 Ring gear of the second planetary gear set
03 Shifting element
06 Shifting element
08 Shifting element
09 Shifting element
13 Shifting element
14 Shifting element
18 Shifting element
28 Shifting element
G1-06 First to sixth forward gears
R1 First reverse gear
R2 Second reverse gear
SM Sliding sleeve

The invention claimed is:

1. A positive-locking shifting device of a transmission, the transmission including at least a first planetary gear set and a second planetary gear set, the positive-locking shifting device comprising:
a single element that is axially displacable between a first shifting position and a second shifting position,
wherein the positive-locking shifting device is configured such that the positive-locking shifting device connects one element of the first planetary gear set to one element of the second planetary gear set in the first shifting position of the single element and connects an additional element of the second planetary gear set to a torque-proof element of the transmission in the second shifting position of the single element,
wherein a shiftable operative connection between the torque-proof element and the additional element of the second planetary gear set is arranged, at least in sections, axially between the first and second planetary gear sets, and
wherein the shiftable operative connection between the torque-proof element and the additional element of the second planetary gear set intersects with a shiftable operative connection between the one element of the first planetary gear set and the one element of the second planetary gear set.

2. The positive-locking shifting device of claim 1, wherein the positive-locking shifting device is configured such that the positive-locking shifting device connects the one element of the first planetary gear set to the torque-proof element of the housing in the second shifting position.

3. The positive-locking shifting device of claim 1, wherein a sun gear, a carrier or a ring gear of the first planetary gear set forms the one element of the first planetary gear set, wherein a ring gear of the second planetary gear set forms the one element of the second planetary gear set, and wherein a carrier of the second planetary gear set forms the additional element of the second planetary gear set.

4. The positive-locking shifting device of claim 3, wherein a sun gear of the first planetary gear set and a sun gear of the second planetary gear set are constantly connected to each other.

5. The positive-locking shifting device of claim 1, wherein the single element is axially displacable to a neutral position between the first shifting position and the second shifting position, in which none of the one element of the first planetary gear set, the one element of the second planetary gear set, the additional element of the second planetary gear set and the torque-proof element of the transmission are connected to one another other with the single element.

6. The positive-locking shifting device of claim 1, wherein the single element is disposed in the first shifting position hi all forward gears of the transmission, and wherein the single element is disposed in the second shifting position in at least one reverse gear of the transmission.

\* \* \* \* \*